United States Patent [19]

Finsterwalder et al.

[11] 4,282,036

[45] Aug. 4, 1981

[54] FLOWABLE CONCRETE MIXTURE

[75] Inventors: Ulrich Finsterwalder, Munich; Klemens Finsterwalder, Berg Starnberger See; Kurt Koch, Puchheim; Hans Puls, Hamburg, all of Fed. Rep. of Germany

[73] Assignee: Dyckerhoff & Widmann Aktiengesellschaft, Munich, Fed. Rep. of Germany

[21] Appl. No.: 86,521

[22] Filed: Oct. 19, 1979

Related U.S. Application Data

[63] Continuation-in-part of Ser. No. 863,408, Dec. 22, 1977, abandoned.

[30] Foreign Application Priority Data

Dec. 22, 1976 [DE] Fed. Rep. of Germany ....... 2658128

[51] Int. Cl.$^3$ .............................................. C04B 13/02
[52] U.S. Cl. ...................................... 106/97; 106/98; 106/DIG. 1
[58] Field of Search ................... 106/97, 98, DIG. 1; 114/65 A

[56] References Cited

U.S. PATENT DOCUMENTS

| | | | |
|---|---|---|---|
| 2,517,993 | 8/1950 | Falco | 106/86 |
| 3,754,954 | 8/1973 | Gabriel et al. | 106/98 |
| 3,834,916 | 9/1974 | Kesler | 106/DIG. 1 |
| 3,982,954 | 9/1976 | Jeskey | 106/DIG. 1 |
| 4,052,220 | 10/1977 | Turpin | 106/97 |
| 4,095,988 | 6/1978 | Jancek et al. | 106/97 |
| 4,095,995 | 6/1978 | Ullrich | 106/97 X |
| 4,144,078 | 3/1979 | Colwell | 106/97 |

FOREIGN PATENT DOCUMENTS 102157 10/1937 Australia ................... 106/97
47-44970 11/1972 Japan ...................... 106/97

OTHER PUBLICATIONS

Ferro Cement Boat Hulls–Technical Note–68 5 (Apr. 1968).
"Sailing in Ferro Cement", Yachting Monthly, Apr. 1967, pp. 178-181.
Davis, R. E. et al., "Properties of Cements and Concretes Containing Fly Ash", Journal of the American Concrete Institute, May-Jun. 1937, pp. 579-585 and 606-611.
Hackh's Chemical Dictionary . . . "Concrete", p. 173.
Dyckerhoff & Widmann Brochure . . . "The World's First Concrete Self-Propelled 128,000 m³ LNG Carrier".
Finsterwalder, K., "Cold-Viscous Prestressed Concrete" (Kaltzaher Spannbeton-Ein Sichere und Wirtschaftlicher Baustoff fur LNG-Tanker), HANSA, No. 3, Feb. 1977, pp. 223-227.
"Significance of Tests & Properties of Concrete and Concrete-Making Materials", pub. by ASTM, Phila., 1966, pp. 360-361.
Larned, E. S. et al., "A Study of Sand for Use in Cement Mortar and Concrete", Assoc'n. of Engineering Societies, 1912-48, p. 199.

Primary Examiner—Helen M. McCarthy

[57] ABSTRACT

A flowable concrete mixture which possesses high strength and which provides facile placement of the mixture in structural forms composed of cement glue and aggregates, the viscosity of the cement glue and volume weight of the aggregates being adjusted so that the aggregates are suspended in the cement glue and remain suspended until the cement glue hardens.

4 Claims, No Drawings

FLOWABLE CONCRETE MIXTURE

CROSS-REFERENCE TO RELATED APPLICATIONS

This application is a continuation-in-part application of copending application Ser. No. 863,408, filed on Dec. 22, 1977 now abandoned.

BACKGROUND OF THE INVENTION

1. Field of the Invention

The invention relates to a flowable concrete mixture of cement glue and aggregates for the production of steel concrete or prestressed concrete.

2. Description of the Prior Art

Concrete is a mixture of cement glue, i.e., a mixture of cement and water and solid components, the latter being the so-called aggregates. These aggregates consist of natural or artificial, dense or porous rock and have particle sizes which are suited for the purpose of the concrete. In accordance with current concrete technology, the aggregates which are graded according to certain particle sizes, form a so-called granular skeleton in which the individual particles contact and support each other. Between the particles or aggregates are spaces or voids. The cement glue fills these hollow spaces and bonds the particles together. Accordingly, a certain ratio by volume of aggregates and cement glue must be present, i.e., the amount of cement glue is that volume necessary to fill the hollow spaces. An excess of one or the other, for example, cement glue, would lead to immediate segregation since the particles of the aggregates support one another and would sink to the bottom. The cement glue thus settles at the surface and this leads to the formation of cracks.

When placing the fresh concrete in the formwork, the concrete must be compacted by using vibrating devices to achieve a dense structure and a complete covering of the steel reinforcements as well as to avoid structural pores in the concrete structure and in the end surfaces at the formwork. These structural pores are caused by enclosed air bubbles. These requirements must be followed the more exact, the denser the structural element to be produced is reinforced.

The energy required for a correct compacting of the concrete depends on the consistency of the concrete. This consistency, in turn, depends largely on the cement glue content of the concrete as well as on the particle size and the volume weight of the aggregates. The lower the cement glue content, the dryer the content and the larger the energy requirement for compacting, for example, by tamping or vibrating. The larger the cement glue content, the softer the concrete and the better the workability of the concrete. The strength of the concrete is largely determined by the quality of the cement glue and by the ratio by weight of the water and the cement contained in the concrete, the so-called water-cement ratio. The addition of water alone improves the workability of the mixture, however, the strength properties are changed.

It is known to improve the flow properties of concrete by adding chemical admixtures. These admixtures counteract the inner friction of the mixture. However, these admixtures are effective only over a limited time. They cause the heavier components of the aggregates to settle out more than the lighter components because the inner friction is eliminated, especially, when the consistency of the fresh concrete is soft. This is disadvantageous in that, in the finished concrete, a layering of the aggregates may occur corresponding to the volume weight of the individual components.

SUMMARY OF THE INVENTION

It is the purpose of the present invention to provide a flowable concrete which, while being of high strength, has a low water-cement ratio. We have thus discovered a concrete which is easily conveyed and placed and this allows a complete covering of the steel reinforcements without requiring a substantial compacting effort. In addition, in such concrete, structural pores in the concrete structure and in the end surfaces can be substantially avoided.

More particularly, the present invention resides in adjusting the viscosity of the cement glue and the particle size as well as the volume weight of the aggregates and using a volume of cement glue in excess of that required to fill up the volume of the hollow spaces such that the aggregates in the cement glue remain suspended, i.e., do not support one another, until the cement glue has hardened.

The concrete according to the invention differs substantially in its structure from the conventional concrete structure obtained using previous concrete technology.

In contrast to the known concrete structure, in which the cement glue merely fills the hollow spaces between the particles of the aggregates, the cement glue according to the present invention forms a viscous fluid in which the aggregates are suspended. Accordingly, the larger percentage of the volume of the concrete is occupied by the cement glue, while the percentage occupied by the aggregates becomes smaller.

DESCRIPTION OF THE PREFERRED EMBODIMENT

The concrete composition of the present invention also has, compared to conventional concrete, a proportionally large percentage of cement, due to the large share of cement glue. In order to limit the heat of hydration during setting, it is advantageous to use a quick and less quick setting cement at the same time.

In order to increase the viscosity and to save cement, fine particles may be added to the cement glue as fillers for the formation of a matrix. These fine particles advantageously have a rounded shape and therefore, a large surface area. Pozzolana are advantageously used as admixtures, such as, fly ash or trass, limestone powder or the like. Sand and/or light aggregates, such as, expanded shale or expanded clay, are advantageously used as aggregates.

The proportions of cement, water, and concrete aggregates, as well as the particle size of the concrete aggregates will vary, depending on the purpose of the cement chosen. If a light concrete is to be produced, materials having a low volume to weight ratio are chosen as the concrete aggregates. Since such light materials, when used as concrete aggregates, have the effect of decreasing the flowability of the concrete, such a mixture requires a somewhat higher share of water than a heavy concrete, in which the components of the concrete aggregates which have a high volume to weight ratio, improve the spreading and therefore, the flowability of the concrete. In any event, it is possible to easily adjust the individual components such that for each individual case optimum additions are achieved.

The flowability of the concrete produced according to the present invention is sufficiently high that it can be pumped through flexible hose lines having a diameter of only 60 mm without the danger of segregation of the concrete. Such light, flexible hose pipes facilitate an accurate placing of the concrete through filler openings which are generally staggered in regular spaced manner and placed at the formwork walls of each structural concrete element to be produced.

The liquid consistency of the concrete produced according to the inventive method has a 30 to 50% longer setting time than a comparable normal concrete. This allows more time for placing the concrete. Also, plasticizing admixtures very often are not required.

In order to completely cover the reinforcements for the structure, only very ittle energy in terms of shaking, knocking or light vibration is necessary to remove the air from the concrete mixture and to eliminate any structural pores in boundary areas even in the case when the reinforcements and the points of junction are narrowly placed. The knocking or vibrating is generally effected by vibrators mounted at different exterior portions of the formwork. A conventional concrete, in comparison, would require very powerful exterior or interior vibrators which would not be sufficiently effective if the reinforcement with its points of junction are narrowly placed.

Due to the dense structure and absence of structural pores of concrete obtained with the present invention, excellent corrosion protection for the steel reinforcement is obtained. In addition, the concrete is, to a large degree, watertight. Also, because of its liquid consistency, the concrete provides a large amount of fine-grained mortar which, in conjunction with the small amount of energy required for compacting, leads to smooth wall surfaces.

Accordingly, the inventive concrete is especially suited for floating bodies made of steel and concrete. Because these floating bodies have large forces acting upon them, but must have minimum weight, they usually have relatively thin wall thicknesses and large amounts or reinforcement. In this case, a smooth outer surface and a good corrosion protection for the steel reinforcements is especially necessary.

The following table sets forth a comparison of a composition in accordance with the present invention and a conventional composition.

| Material | (a) Concrete according to the Invention | | | (b) Conventional Concrete Bn 450 | | |
|---|---|---|---|---|---|---|
| | Weight kg | Volume of Material $dm^3$ | Percentage % | Weight kg | Volume of Material $dm^3$ | Percentage % |
| Cement | 760 | 25 | 25.0 | 390 | 126 | 12.6 |
| Water | 327 | 327 | 32.7 | 191 | 191 | 19.1 |
| Fly Ash | 100 | 46 | 4.6 | — | — | — |
| Sand 0/2 | 394 | 151 | 15.1 | 806 | 306 | 30.8 |
| Expanded Shale 0/6 | 374 | 226 | 22.6 | — | — | — |
| Gravel 8/16 | — | — | — | 970 | 375 | 37.5 |
| | 1,955 | 1,000 | 100.0 | 2,357 | 1,000 | 100.0 |
| Water-Cement Ratio | $\frac{327}{760} = 0.43$ | | | $\frac{191}{390} = 0.49$ | | |

What is claimed is:

1. In a concrete mixture for the production of steel reinforcing concrete or prestressed concrete suitable for use as water-tight floating bodies made of steel and concrete wherein cement glue composed of a mixture of cement and water is used to fill the hollow spaces between the pieces of a particulate aggregate and hold said aggregate together, the improvement consisting essentially of the volume of cement glue being larger than the volume required to fill the hollow spaces between the particulate aggregate alone and the viscosity of the cement glue, the particle size and the volume/-weight ratio of the aggregate being adjusted so that the aggregate particles are suspended in the cement glue and remain suspended until the cement glue hardens and wherein the cement glue contains pozzolana as a filler for the formation of a matrix.

2. The concrete mixture of claim 1 wherein the fine pozzolana particles have a round shape.

3. The concrete mixture of claim 1 wherein the pozzolana are selected from the group consisting of fly ash, trass and limestone powder.

4. The concrete mixture of claim 1 wherein aggregates are selected from the group consisting of sand, expanded shale, and expanded clay.